(12) United States Patent
Kitchens et al.

(10) Patent No.: US 11,087,108 B2
(45) Date of Patent: Aug. 10, 2021

(54) FINGERPRINT SENSOR SYSTEM INCLUDING METAMATERIAL

(71) Applicant: QUALCOMM Incorporated, San Diego, CA (US)

(72) Inventors: Jack Conway Kitchens, Buffalo, NY (US); John Keith Schneider, Williamsville, NY (US); Stephen Michael Gojevic, Lockport, NY (US); Evan Michael Breloff, Kenmore, NY (US); James Anthony Miranto, Kenmore, NY (US); Emily Kathryn Brooks, Kenmore, NY (US); Fitzgerald John Archibald, Richmond Hill (CA); Alexei Stoianov, Toronto (CA); Raj Kumar, San Diego, CA (US); Sai Praneeth Sreeram, Anantapur (IN); Nirma Lnu, Hyderabad (IN); Sandeep Louis D'Souza, San Diego, CA (US); Nicholas Ian Buchan, San Jose, CA (US); Yipeng Lu, Davis, CA (US); Chin-Jen Tseng, Fremont, CA (US); Hrishikesh Vijaykumar Panchawagh, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/691,416

(22) Filed: Nov. 21, 2019

(65) Prior Publication Data

US 2021/0158002 A1    May 27, 2021

(51) Int. Cl.
*G06K 9/00*    (2006.01)
*G02B 1/00*    (2006.01)

(52) U.S. Cl.
CPC .......... *G06K 9/0002* (2013.01); *G02B 1/002* (2013.01); *G06K 9/00053* (2013.01); *G06K 9/00093* (2013.01); *G06K 9/001* (2013.01)

(58) Field of Classification Search
CPC ............. G06K 9/00093; G06K 9/0002; G06K 9/00053; G06K 9/001; G02B 1/002
See application file for complete search history.

(56) References Cited

U.S. PATENT DOCUMENTS

2017/0323132 A1* 11/2017 Lu ...................... G06K 9/00093

FOREIGN PATENT DOCUMENTS

| CN | 109651900 A | 4/2019 |
| CN | 110210442 A | 9/2019 |
| KR | 20160089816 A | 7/2016 |

OTHER PUBLICATIONS

International Search Report and Written Opinion—PCT/US2020/061683—ISA/EPO—dated Apr. 15, 2021.

\* cited by examiner

*Primary Examiner* — Abdul-Samad A Adediran
(74) *Attorney, Agent, or Firm* — Weaver Austin Villeneuve & Sampson LLP

(57) ABSTRACT

An apparatus may include a cover layer, a layer of first metamaterial proximate (or in) the cover layer, a light source system configured for providing light to the layer of first metamaterial and a receiver system. The first metamaterial may include nanoparticles configured to create ultrasonic waves when illuminated by light. The receiver system may include an ultrasonic receiver system configured to receive ultrasonic waves reflected from a target object in contact with, or proximate, a surface of the cover layer. The control system may be configured to receive ultrasonic receiver signals from the ultrasonic receiver system corresponding to the ultrasonic waves reflected from the target object and to (Continued)

perform an authentication process and/or an imaging process that is based, at least in part, on the ultrasonic receiver signals.

30 Claims, 11 Drawing Sheets

FINGERPRINT SENSOR SYSTEM INCLUDING METAMATERIAL

TECHNICAL FIELD

This disclosure relates generally to biometric devices and methods, including but not limited to ultrasonic sensor systems and optical sensor systems.

DESCRIPTION OF THE RELATED TECHNOLOGY

An ultrasonic fingerprint sensor system or an optical fingerprint sensor system can be good means for obtaining a biometric identifying image of a target object, such as a finger. Under-display ultrasonic fingerprint sensors have been recently commercialized in the market. Although some previously-deployed fingerprint sensor systems were generally satisfactory for some applications, improved fingerprint sensor systems would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. In some examples, the apparatus may include a cover layer, a layer of first metamaterial within or proximate the cover layer, a light source system configured for providing light to the layer of first metamaterial and a receiver system comprising an ultrasonic receiver system configured to receive ultrasonic waves reflected from a target object in contact with, or proximate, a surface of the cover layer. The first metamaterial may include nanoparticles that are configured to resonate and to create an ultrasonic wave when illuminated by light. In some implementations, a mobile device may be, or may include, the apparatus. For example, a cellular telephone may be, or may include, the apparatus.

According to some implementations, the light source system may include a waveguide proximate the layer of first metamaterial. The waveguide may be configured for receiving light from the light source and providing the light to the layer of first metamaterial. In some examples, the light source system may include a light source configured to emit light that includes a resonant frequency of at least some of the nanoparticles.

According to some examples, the apparatus includes a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

In some implementations, the control system may be configured to control the light source system to cause the nanoparticles to emit ultrasonic waves in the range of 1 MHz to 30 MHz. According to some implementations, the control system may be configured to receive ultrasonic receiver signals from the ultrasonic receiver system corresponding to the ultrasonic waves reflected from the target object and to perform an authentication process and/or an imaging process that is based, at least in part, on the ultrasonic receiver signals.

According to some examples, the cover layer may be, or may include, an optically opaque or optically translucent platen. However, in some examples the cover layer may be optically transparent.

Some implementations may include a layer of second metamaterial that is configured to convert acoustic waves into light. In some such examples, the cover layer may include the layer of second metamaterial.

In some implementations, the receiver system may include an optical receiver system. According to some such implementations, a single layer of the receiver system may include portions of the optical receiver system and portions of the ultrasonic receiver system. Some such implementations also may include a control system. The control system may, in some examples, be configured to receive optical receiver signals from the optical receiver system and to perform an authentication process and/or an imaging process that is based, at least in part, on the optical receiver signals. In some instances, at least some of the optical receiver signals may correspond to light emitted by the second metamaterial. In some examples, the control system may be configured to control the light source system to induce photoacoustic emissions from the target object. According to some examples, at least some of the optical receiver signals may correspond to light reflected from the target object. The control system may, in some examples, be configured to receive ultrasonic receiver signals from the ultrasonic receiver system corresponding to the ultrasonic waves reflected from the target object and to perform the authentication process and/or the imaging process based, at least in part, on the ultrasonic receiver signals.

According to some examples, the ultrasonic receiver system may include a piezoelectric layer. The piezoelectric layer may, in some instances, include micro-particles and/or nano-particles in a piezoelectric polymer matrix. The micro-particles and/or nano-particles may, for example, include ferroelectric material.

Still other innovative aspects of the subject matter described in this disclosure can be implemented in a method. The method may involve controlling a light source system to emit light that causes at least some nanoparticles of a layer of first metamaterial to emit ultrasonic waves. The method may involve receiving first ultrasonic receiver signals from an ultrasonic receiver system corresponding to ultrasonic waves generated by the nanoparticles and reflected from a target object. The method may involve performing an imaging process and/or an authentication process based, at least in part, on the first ultrasonic receiver signals.

According to some examples, the method may involve controlling the light source system to illuminate at least a portion of the target object. In some examples, the method may involve receiving optical receiver signals from an optical receiver system corresponding to light reflected from the target object and performing the imaging process or the authentication process based, at least in part, on the optical receiver signals.

In some implementations, the method may involve controlling the light source system to induce photoacoustic emissions from at least a portion of the target object. In some examples, the method may involve receiving second ultrasonic receiver signals from the ultrasonic receiver system corresponding to ultrasonic waves produced via the photoacoustic emissions and performing the imaging process and/or the authentication process based, at least in part, on the second ultrasonic receiver signals.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

For example, the software may include instructions for controlling one or more devices to perform a method that involves controlling a light source system to emit light that causes at least some nanoparticles of a layer of first metamaterial to emit ultrasonic waves. The method may involve receiving first ultrasonic receiver signals from an ultrasonic receiver system corresponding to ultrasonic waves generated by the nanoparticles and reflected from a target object. The method may involve performing an imaging process and/or an authentication process based, at least in part, on the first ultrasonic receiver signals.

According to some examples, the method may involve controlling the light source system to illuminate at least a portion of the target object. In some examples, the method may involve receiving optical receiver signals from an optical receiver system corresponding to light reflected from the target object and performing the imaging process or the authentication process based, at least in part, on the optical receiver signals.

In some implementations, the method may involve controlling the light source system to induce photoacoustic emissions from at least a portion of the target object. In some examples, the method may involve receiving second ultrasonic receiver signals from the ultrasonic receiver system corresponding to ultrasonic waves produced via the photoacoustic emissions and performing the imaging process and/or the authentication process based, at least in part, on the second ultrasonic receiver signals.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
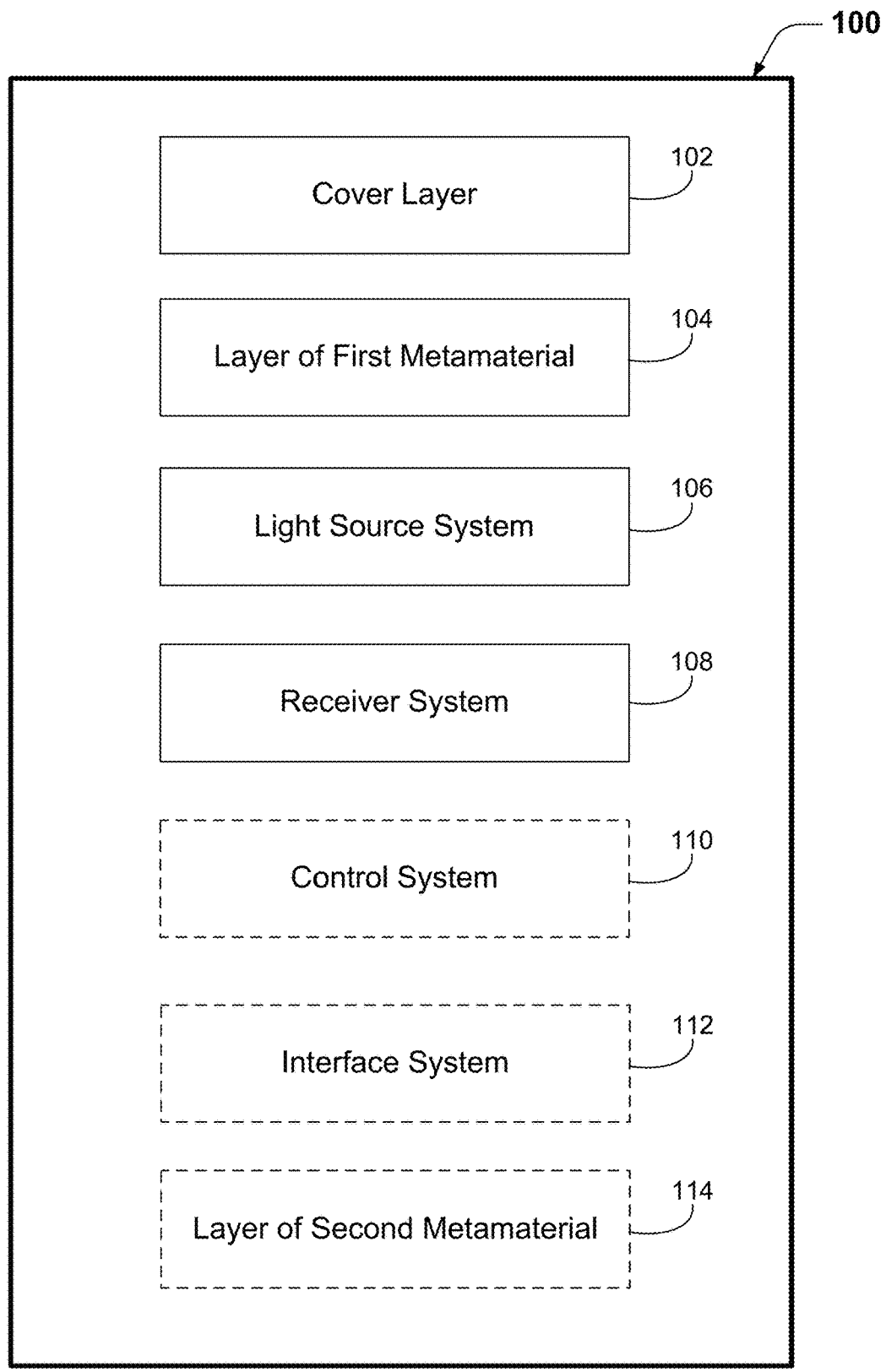
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

An ultrasonic fingerprint sensor can, in many circumstances, obtain a suitable biometric identifying image of a finger or other target object. However, some acoustic insonification processes have significant power requirements. Some films used for screen protection can significantly attenuate ultrasonic signals. Moreover, issuing a high-voltage pulse into a piezoelectric transmitter can bring unwanted electrical noise to the system.

Some such implementations use light to generate waves of ultrasonic or acoustic energy at or near an outer surface (such as a platen surface or a cover layer) using photoacoustically-activated nanoparticles. For example, light may be provided to a leaky light waveguide and may be directed through a layer of nanoparticles. Alternatively, or additionally, the waveguide itself may include nanoparticles. Some disclosed sensor systems may include nanoparticles in a platen or a cover layer. The nanoparticles may resonate and create ultrasonic waves via thermo-elastic heating. Some of the resulting ultrasound waves may travel toward the outer surface where they interact with structures of a target object, such as the ridges and valleys of a finger in contact with the outer surface. Ultrasonic waves contacting air spaces corresponding to the valleys may be reflected and may be detected by an ultrasonic receiver array. A control system may be configured to perform an authentication process and/or an imaging process based, at least in part, on ultrasonic receiver signals received from the ultrasonic receiver array. Some implementations may include a piezoelectric ultrasonic receiver, transmitter or transceiver layer that includes micro- or nano-ferroelectric particles.

Some implementations also may include an optical receiver array. Some such implementations may include both optical and ultrasonic receivers in a single receiver layer. A control system may be configured to control the light source system to illuminate at least a portion of the target object. The control system may be configured to perform an authentication process and/or an imaging process based, at least in part, on optical receiver signals received from the optical receiver array. In some such implementations, the control system may be configured to control the light source system to induce photoacoustic emissions from the target object. In some examples, an apparatus may include a layer of second metamaterial that is configured to convert acoustic waves into light.

Particular implementations of the subject matter described in this disclosure may be implemented to realize one or more of the following potential advantages. A higher signal may be gained from a piezoelectric receiver or transmitter by including micro- or nano-particles of a ferroelectric material that has a high electromechanical coupling factor with a suitable piezoelectric polymer matrix such as polyvinylidene fluoride (PVDF) or polyvinylidene fluoride-trifluoroethylene (PVDF-TrFE) copolymers. Some disclosed ultrasonic sensor systems having photoacoustically-activated nanoparticles, as well as those configured to induce photoacoustic emissions from a target object, do not require a piezoelectric transmitter. In such sensor systems, there is no need to provide a high-voltage pulse to a piezoelectric transmitter and no associated electrical noise will be caused. Sensor systems that are configured to perform an authentication process and/or an imaging process that is based, at least in part, on optical receiver signals may be able to ameliorate the attenuation of ultrasonic signals caused by some films that are used for screen protection.

FIG. 1 is a block diagram that shows example components of an apparatus according to some disclosed implementations. In this example, the apparatus 100 includes a cover layer 102 and a layer of first metamaterial 104. The cover layer 102 may, in some examples, be optically transparent. However, in some implementations the cover layer 102 may be optically opaque or optically translucent. For example, the cover layer 102 may be, or may include, an optically opaque or optically translucent platen.

According to this implementation, the layer of first metamaterial 104 includes nanoparticles that are configured to resonate and create an ultrasonic wave when illuminated by light. The layer of first metamaterial 104 may include such nanoparticles dispersed in binder material, such as a transparent binder material. In some implementations the layer of first metamaterial 104 may be proximate the cover layer 102 and may, in some examples, be adjacent to the cover layer 102. However, in some examples, at least some of the nanoparticles (and/or other metamaterial) may reside in the cover layer 102.

In this example, the apparatus 100 includes a light source system 106. According to some implementations, the light source system 106 is configured for providing light to the layer of first metamaterial 104. According to some implementations, the light source system 106 may include one or more light sources that are configured to emit light that includes a resonant frequency of at least some of the nanoparticles. Relatively larger particles will generally resonate at relatively lower frequencies and relatively smaller particles will generally resonate at relatively higher frequencies. It may be advantageous to have the particles sized to vibrate at one or more operating frequencies of interest. In some examples, the light source may be, or may include, one or more light-emitting diodes (LEDs) and/or one or more laser diodes. According to some implementations, the LEDs may be organic light-emitting diodes (OLEDs). In some implementations, the light source may be configured to provide light that is invisible to the human eye, such as infrared or ultraviolet light.

In some examples, the light source system 106 may include a waveguide proximate the layer of first metamaterial 104. The waveguide may be configured for receiving light from the light source and providing the light to the layer of first metamaterial 104. For example, the light source system 106 may include a light source and a leaky light waveguide. Light from the light source may be provided to the leaky light waveguide and may be directed towards the cover layer 102 (e.g., upward) through nanoparticles in the layer of first metamaterial 104 and/or the cover layer 102. Alternatively, or additionally, the waveguide itself may include such nanoparticles.

According to some examples, the light source may be, or may include, a pulsed light source. Some such implementations may include a control system 110. In some such implementations, the control system 110 may be configured to control the light source system to cause the nanoparticles to emit ultrasonic waves in the range of 5 MHz to 30 MHz. However, in other implementations the control system 110 may be configured cause the nanoparticles to emit ultrasonic waves in a frequency range that is above or below the range of 5 MHz to 30 MHz. For example, in some implementations the control system 110 may be configured to control the light source system to cause the nanoparticles to emit ultrasonic waves in the range of 1 MHz to 5 MHz, e.g., in the range of 1 MHz to 2.5 MHz. Such implementations may cause the nanoparticles of the layer of first metamaterial 104 to emit ultrasonic waves in a range suitable for an ultrasonic imaging process and/or authentication process.

In this example, the apparatus 100 includes a receiver system 108. In some implementations, the receiver system 108 includes an ultrasonic receiver system. In some such implementations, the control system may be configured to receive ultrasonic receiver signals from the ultrasonic receiver system corresponding to the ultrasonic waves reflected from a target object in contact with, or proximate, a surface of the cover layer 102. The control system may be configured to perform at least one of an authentication process or an imaging process that is based, at least in part, on the ultrasonic receiver signals.

In some such implementations, the ultrasonic receiver system includes piezoelectric material, such as a PVDF polymer or a PVDF-TrFE copolymer. In some implementations, a separate piezoelectric layer may serve as the ultrasonic transmitter. In some implementations, a single piezoelectric layer may serve as the transmitter and as a receiver. Other implementations may have an ultrasonic receiver but not an ultrasonic transmitter. In some implementations, other piezoelectric materials may be used in the piezoelectric layer, such as aluminum nitride (AlN) or lead zirconate titanate (PZT).

According to some examples, the piezoelectric material may include micro-particles or nano-particles in a piezoelectric polymer matrix. In some such implementations, the micro-particles and/or the nano-particles may include ferroelectric material. In some examples, the micro-particles and/or the nano-particles may include ZnO, PZT and/or BaTiO3. According to some implementations, the micro-particles and/or the nano-particles may have a diameter that is in the range of 3 nm to 200 nm.

In some instances, the receiver system 108 may include an optical receiver system. According to some such implementations, a single layer of the receiver system 108 may include portions of an optical receiver system and portions of an ultrasonic receiver system. Some examples are described below.

The control system 110 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 110 also may include (and/or be configured for communication with) one or more memory devices, such as one or more random access memory (RAM) devices, read-only memory (ROM) devices, etc. Accordingly, the apparatus 100 may have a memory system that includes one or more memory devices, though the memory system is not shown in FIG. 1. The control system 110 may be capable of receiving and processing data from the receiver system 108. If the apparatus 100 includes an ultrasonic transmitter, the control system 110 may be capable of controlling the ultrasonic transmitter 108. In some implementations, functionality of the control system 110 may be partitioned between one or more controllers or processors, such as a dedicated sensor controller and an applications processor of a mobile device.

Some implementations of the apparatus 100 may include an interface system 112. In some examples, the interface system may include a wireless interface system. In some implementations, the interface system may include a user interface system, one or more network interfaces, one or more interfaces between the control system 110 and a memory system and/or one or more interfaces between the control system 110 and one or more external device interfaces (e.g., ports or applications processors).

The interface system 112 may be configured to provide communication (which may include wired or wireless communication, such as electrical communication, radio communication, etc.) between components of the apparatus 100. In some such examples, the interface system 112 may be configured to provide communication between the control system 110 and the receiver system 108 and/or the light source system 106. According to some such examples, a portion of the interface system 112 may couple at least a portion of the control system 110 to the receiver system 108 and/or the light source system 106, e.g., via electrically conducting material. If the apparatus 100 includes an ultrasonic transmitter 108 that is separate from the receiver system 108, the interface system 112 may be configured to provide communication between at least a portion of the control system 110 and the ultrasonic transmitter 108.

According to some examples, the interface system 112 may be configured to provide communication between the apparatus 100 and other devices and/or human beings. In some such examples, the interface system 112 may include one or more user interfaces. The interface system 112 may, in some examples, include one or more network interfaces and/or one or more external device interfaces (such as one or more universal serial bus (USB) interfaces). In some implementations, the apparatus 100 may include a memory system. The interface system 112 may, in some examples, include at least one interface between the control system 110 and a memory system.

The apparatus 100 may be used in a variety of different contexts, some examples of which are disclosed herein. For example, in some implementations a mobile device may include at least a portion of the apparatus 100. The mobile device may, in some instances, be a cellular telephone, a tablet device, etc. In some implementations, a wearable device may include at least a portion of the apparatus 100. The wearable device may, for example, be a bracelet, an armband, a wristband, a ring, a headband or a patch. In some implementations, the control system 110 may reside in more than one device. For example, a portion of the control system 110 may reside in a wearable device and another portion of the control system 110 may reside in another device, such as a mobile device (e.g., a smartphone or a tablet computer). The interface system 112 also may, in some such examples, reside in more than one device.

Figure 2:
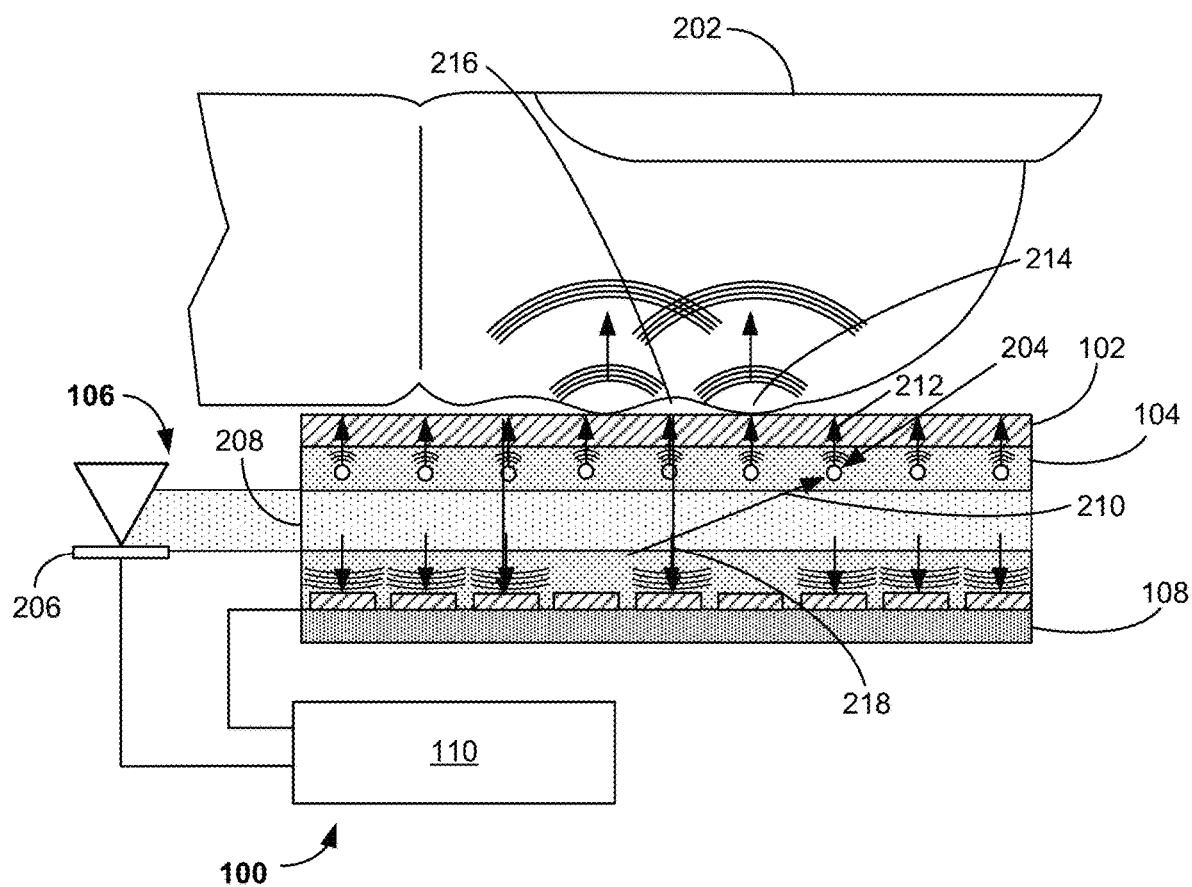
FIG. 2 shows another example of an apparatus configured to perform at least some methods disclosed herein.

FIG. 2 shows another example of an apparatus configured to perform at least some methods disclosed herein. The apparatus 100 of FIG. 2 may be considered an instance of the apparatus 100 shown in FIG. 1. In this example, the light source system 106 includes a light source 206 and a waveguide 208. According to this example, the layer of first metamaterial 104 resides between the waveguide 208 and the cover layer 102, on which a target object 202 is placed. The target object 202 is a finger in this example. (As used herein, the term "finger" has a meaning that is broad enough to refer to any digit, including a thumb. Accordingly, the term "fingerprint" has a meaning that is broad enough to refer to the print of any digit, including a thumbprint.)

In some implementations, the light source 206 includes at least one LED and/or at least one laser diode. According to this example, the waveguide 208 is configured to direct at least some of the light provided by the light source 206 to the layer of first metamaterial 104.

In this implementation, the layer of first metamaterial 104 includes nanoparticles 204 that are configured to resonate and create an ultrasonic wave when illuminated by light. In this example, the layer of first metamaterial 104 includes binder material in which the nanoparticles 204 are suspended. In some such examples, the binder material may include a transparent material, such as a transparent polymeric binder. According to some examples the nanoparticles 204 may include gold nanoparticles. In some instances, the nanoparticles 204 may include carbon nanoparticles. According to some such examples, the nanoparticles 204 may include the type of carbon black particles used in India ink. In some examples, the nanoparticles 204 may be as small as 10 nanometers, whereas in other examples the nanoparticles 204 may be 100 nanometers or more in size.

In the example shown in FIG. 2, the nanoparticles 204 are used for ultrasonic insonification. In some examples, the light source 206 may be configured to emit light that includes a resonant frequency of at least some of the nanoparticles 204. According to some examples, the light 210 includes a resonant frequency of the nanoparticles 204. Therefore, illumination by the light 210 causes the nanoparticles 204 to expand.

Alternatively, or additionally, in some examples, the pulse duration and/or the time interval between the light pulses emitted by the light source 206 dictates the frequency of the ultrasonic waves 212 that are emitted by the nanoparticles as they expand while illuminated and contract between pulses. In some examples, the light pulses emitted by the light source 206 have a pulse duration that is in the range of 1-5 μs, e.g., 3 μs. In some such examples, the light pulses emitted by the light source 206 have a power density in the range of 0.20 to 1.0 mW/mL, e.g., 0.7 mW/mL.

In the photoacoustic system of apparatus 100, there is a small latency while the nanoparticles heat, expand and then collapse. This latency is well-defined in the literature, e.g., in Chao Tian, Zhixing Xie, Mario L. Fabilli, Shengchun Liu, Cheng Wang, Qian Cheng, and Xueding Wang, "Dual-pulse nonlinear photoacoustic technique: a practical investigation," Optical Society of America, 2015 (hereinafter, "Tian et al.). This latency should be taken into consideration when determining appropriate criteria for the photoacoustic system, e.g., appropriate values for the range gate delay used for obtaining data from the receiver system 108. As noted in Tian et al., it is desirable for the latency to be at least as long as the "stress relaxation time" $\tau_s$ and no longer than the thermal relaxation time $\tau_{th}$. The thermal relaxation time, which is the time required for a target to cool to 50% of its excited state temperature, may be expressed as follows:

$$\tau_{th} = \frac{d^2}{\alpha_{th}} \qquad \text{Equation 1}$$

In Equation 1, d represents the diameter of the target, which in some examples may be the spot size of the light source. In some disclosed implementations, d may be in the range of 1-20 μm. In Equation 1, $\alpha_{th}$ represents the thermal diffusivity. The thermal diffusivity will vary according to the materials used to form the nanoparticles and the binder in which the nanoparticles are dispersed. In some examples, the thermal diffusivity may be in the range of 0.05-2.0 mm$^2$/second. In one example, assuming a thermal diffusivity of 0.13 mm$^2$/second and a target volume of 10 μm, the thermal relaxation time that may be calculated according to Equation 1 is 769 μs.

The stress relaxation time may be expressed as follows:

$$\tau_s = \frac{d}{c_L} \qquad \text{Equation 2}$$

In Equation 2, d represents the diameter of the target and $c_L$ represents the longitudinal speed of sound in the relevant medium. In one example, assuming a longitudinal speed of sound of 1500 meters/second (a typical value for a coating binder) and a target volume of 10 μm, the stress relaxation time that may be calculated according to Equation 2 is 6.7 μs.

Accordingly, in this example the latency while the nanoparticles heat, expand and then collapse would be in the range of 6.7 nanoseconds to 769 microseconds. According to the photoacoustic literature, including Tian et al. the light pulse duration should be less than either time, e.g., in the range of 1 μs to 5 μs. For implementations in which the light source system 106 is configured to emit a series of light pulses, the interval between light pulses should be at least 769 μs in this example in order to avoid ablation and cavitation.

Figure 3:
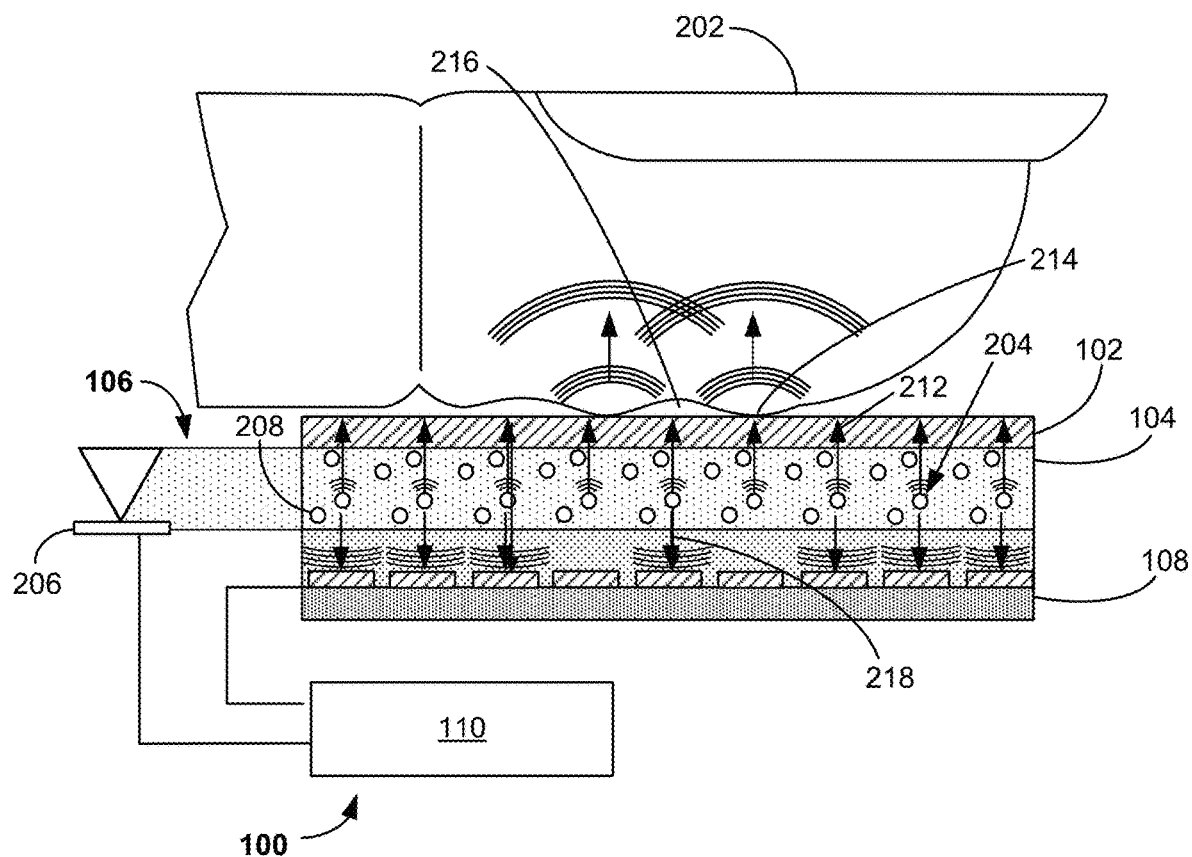
FIG. 3 shows another example of an apparatus configured to perform at least some methods disclosed herein.

Assuming an apparatus configured as shown in FIG. 2 or FIG. 3, if $t_0$ is the time at which the light source system 106 a light pulse, the elapsed time between $t_0$ and the time that the light pulse reaches the nanoparticles is negligible and may be disregarded. In this example, the nanoparticles 204 would begin emitting ultrasonic waves approximately 6.7 μs after $t_0$. The appropriate range gate delay after $t_0$ could be determined by adding this latency to the length of time that it would take for the emitted ultrasonic waves 212 to travel from the nanoparticles 204 to a target area and back to the receiver system 108. For example, for fingerprint imaging, the appropriate range gate delay after $t_0$ could be determined by adding this latency to the length of time that it would take for the emitted ultrasonic waves 212 to travel from the nanoparticles 204 to the outer surface of the cover layer 102 and back to the receiver system 108.

In the example shown in FIG. 2, the ultrasonic waves 212 are shown impinging on ridge areas 214 and valley areas 216 of the finger. There is little impedance contrast between the ridge areas 214 and the cover layer 102, so much of the energy of the ultrasonic waves 212 that impinge on the ridge areas 214 is transmitted into the finger. However, there is a large impedance contrast between air in the valley areas 216 and the cover layer 102, so much of the energy of the ultrasonic waves 212 that impinge on the valley areas 216 is reflected.

Some of these reflected ultrasonic waves 218 are received by an ultrasonic receiver of the receiver system 108. According to some implementations, the control system 110 may be configured to receive ultrasonic receiver signals from the ultrasonic receiver system corresponding to the ultrasonic waves 218 reflected from the target object and to perform an authentication process and/or an imaging process that is based, at least in part, on the ultrasonic receiver signals. Some ultrasonic waves may propagate directly to the ultrasonic receiver system, but these may be distinguished from the reflected ultrasonic waves by selecting a range-gate delay that allows the reflected waves, but not the direct waves, to be sampled.

FIG. 3 shows another example of an apparatus configured to perform at least some methods disclosed herein. The apparatus 100 of FIG. 3 may be considered another instance of the apparatus 100 shown in FIG. 1. The apparatus 100 of FIG. 3 is very similar to that shown in FIG. 2. However, in this example the nanoparticles 204 reside in the waveguide 208. Accordingly, the waveguide 208 includes the layer of first metamaterial 104. The light source 206 may be configured to emit light that includes a resonant frequency of at least some of the nanoparticles 204. According to some examples, the control system 110 may be configured to control the light source 206 to cause the nanoparticles to emit ultrasonic waves in the range of 1 MHz to 30 MHz. According to some implementations, the control system 110 may be configured to receive ultrasonic receiver signals from the ultrasonic receiver system corresponding to the ultrasonic waves 218 reflected from the target object and to perform an authentication process and/or an imaging process that is based, at least in part, on the ultrasonic receiver signals.

Figure 4:
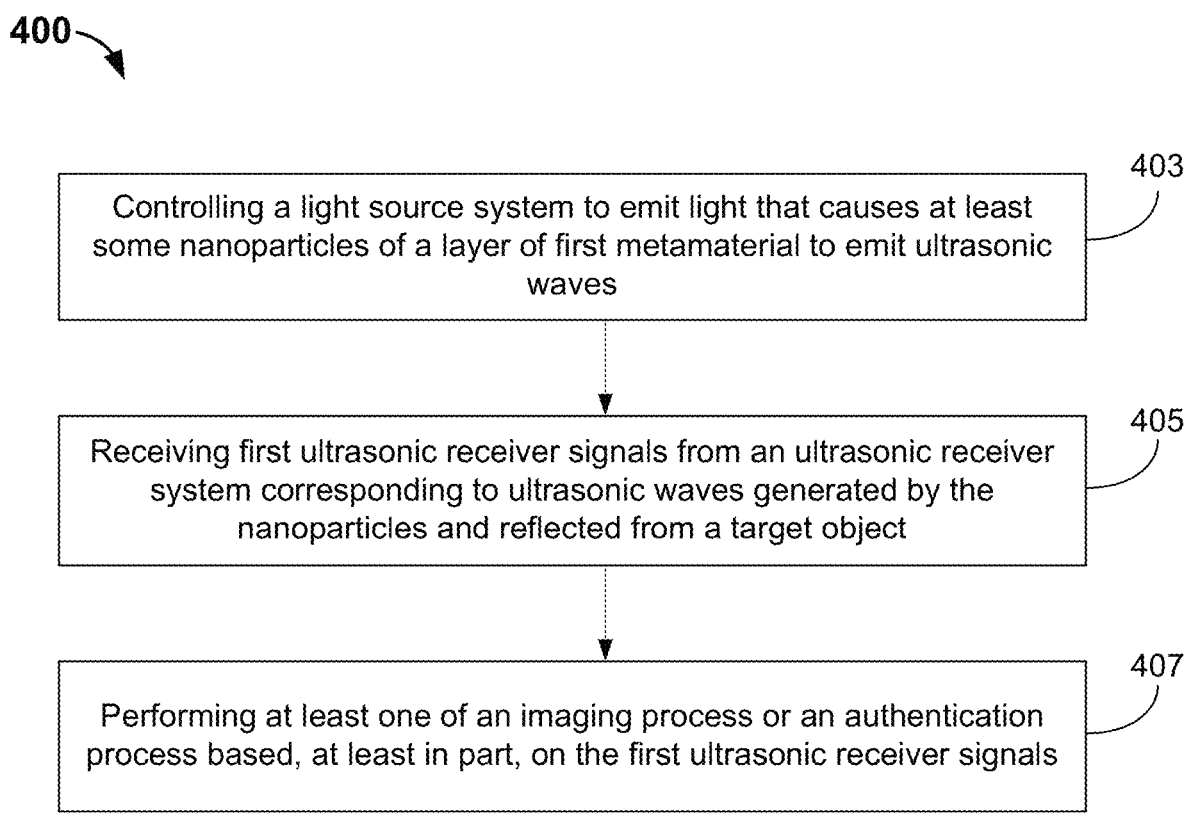
FIG. 4 is a flow diagram that provides an example of a method that may be performed via some disclosed implementations.

FIG. 4 is a flow diagram that provides an example of a method that may be performed via some disclosed implementations. The blocks of method 400 (and those of at least some other disclosed methods) may, for example, be performed by the apparatus 100 shown in one of FIGS. 1-3 or by a similar apparatus. As with other methods disclosed herein, method 400 may include more or fewer blocks than indicated. Moreover, the blocks of methods disclosed herein are not necessarily performed in the order indicated.

In this example, block 403 involves controlling a light source system to emit light that causes at least some nanoparticles of a layer of first metamaterial to emit ultrasonic waves. Here, block 403 involves controlling the light source system to provide pulses of the light to the layer of first metamaterial, the pulses being provided to cause the nanoparticles to emit ultrasonic waves in the range of 1 MHz to 30 MHz. For example, block 403 may involve the control system 110 controlling the light source system 106. Such implementations may cause nanoparticles of the layer of first metamaterial 104 to emit ultrasonic waves in a range suitable for an ultrasonic imaging process and/or authentication process.

According to this example, block 405 involves receiving first ultrasonic receiver signals from an ultrasonic receiver system corresponding to ultrasonic waves generated by the nanoparticles and reflected from a target object. Block 405 may, for example, involve the control system 110 receiving the first ultrasonic receiver signals from the receiver system 108. In other examples the first ultrasonic receiver signals may be received from a memory device, such as a buffer. The ultrasonic receiver signals may correspond to ultrasonic waves reflected from a target object proximate the cover layer 102. The target object may, in some examples, be a person's finger, such as a user's finger. However, in other examples the target object may be an artificial finger-like object, which may be referred to herein as a "fake finger."

In this implementation, block 407 involves performing an imaging process and/or an authentication process based, at least in part, on the first ultrasonic receiver signals. Data received from the receiver system 108 may be referred to herein as "image data," although the image data will generally be received in the form of electrical signals. Accordingly, without additional processing such image data would not necessarily be perceivable by a human being as an image. In some examples, block 407 may involve a noise cancellation process and/or other image processing. In some examples, block 407 may involve constructing a two-dimensional or a three-dimensional image of at least a portion of the target object.

Figure 5:
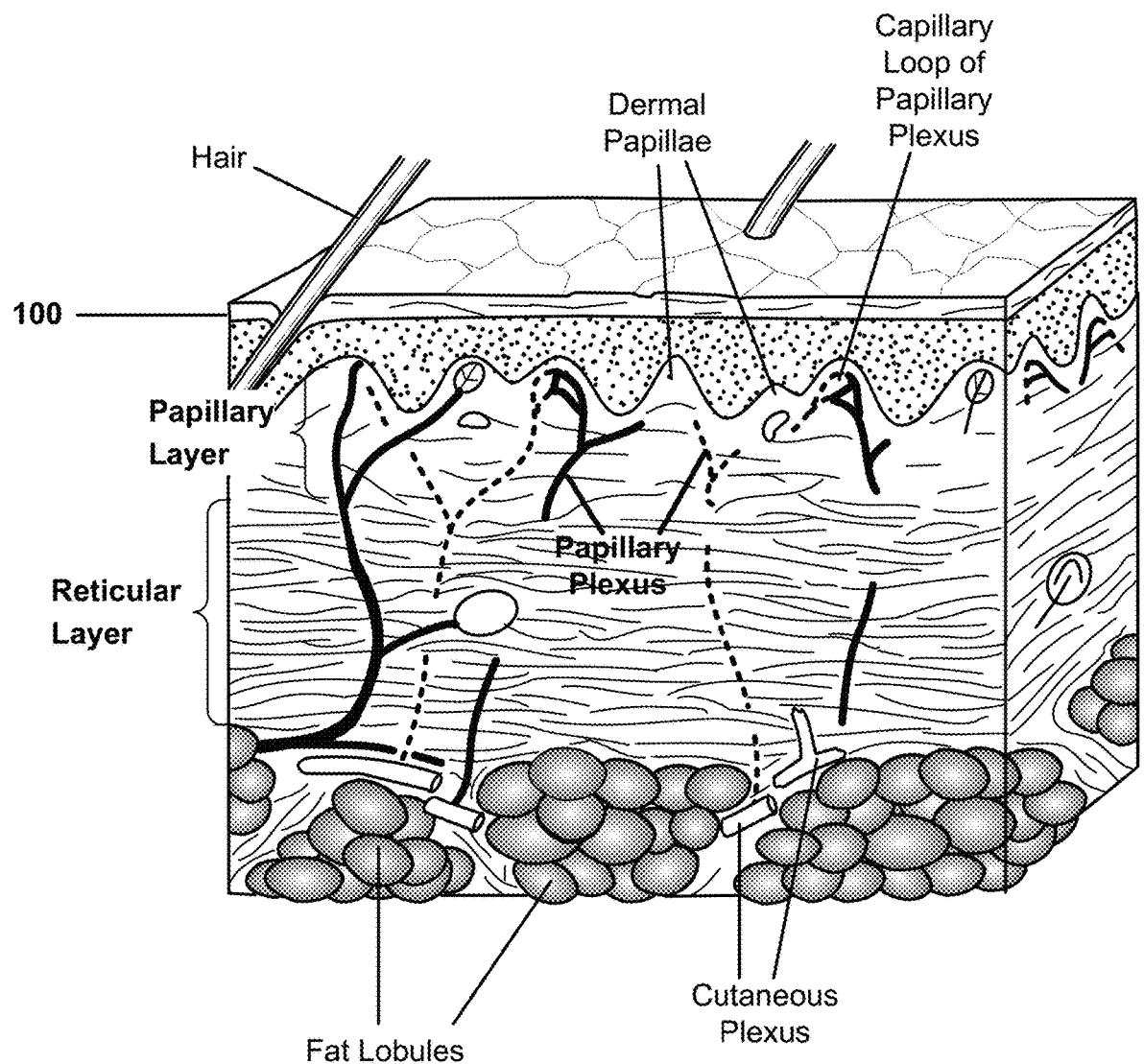
FIG. 5 shows examples of sub-epidermal features.

Some disclosed implementations may include a sensor system that is capable of obtaining image data from the epidermis, such as fingerprint image data, and image data that corresponds to sub-epidermal features. FIG. 5 shows examples of sub-epidermal features. As used herein, the term "sub-epidermal features" may refer to any of the tissue layers that underlie the epidermis 100, including the dermis, the papillary layer, the reticular layer, the subcutis, etc., and any blood vessels, lymph vessels, sweat glands, hair follicles, hair papilla, fat lobules, etc., that may be present within such tissue layers. Accordingly, sub-epidermal features also may include features not shown in FIG. 5, such as muscle tissue, bone material, etc.

If block 407 involves performing authentication process based, at least in part, on the first ultrasonic receiver signals, block 407 may involve the evaluation of epidermal and/or sub-epidermal features. Some spoofing techniques are based on forming fingerprint-like features on an object, which may be a finger-like object. However, making a finger-like object with detailed sub-epidermal features, muscle tissue features and/or bone tissue features would be challenging and expensive. Making such features accurately correspond with those of an authorized user would be even more challenging. Making such features moveable in a human-like biomimicry manner or in a manner replicating a rightful user raises the bar even higher for spoof fabrication. Because some disclosed implementations involve obtaining attribute information that is based, at least in part, on sub-epidermal features, some such implementations may provide more reliable authentication.

Some implementations may be capable of performing enrollment and authentication processes that are based, at least in part, on sub-epidermal features. Some such processes also may be based on fingerprint image data, or on fingerprint minutiae or fingerprint image features such as keypoints derived from fingerprint image data. The authentication processes may involve spoof detection and/or liveness detection.

In some examples, the user authentication process may involve comparing "attribute information" obtained from received image data, based on the signals from an ultrasonic sensor array, with stored attribute information obtained from image data that has previously been received from an authorized user during an enrollment process. According to some such examples, the attribute information may include information regarding sub-epidermal features, such as information regarding features of the dermis, features of the subcutis, blood vessel features, lymph vessel features, sweat gland features, hair follicle features, hair papilla features and/or fat lobule features, along with minutiae or keypoint information associated with an enrolled fingerprint.

Alternatively, or additionally, in some implementations the attribute information obtained from the received image data and the stored attribute information may include information regarding bone tissue features, muscle tissue features and/or epidermal or sub-epidermal tissue features. For example, according to some implementations, the user authentication process may involve obtaining fingerprint image data and sub-epidermal image data. In such examples, the authentication process may involve evaluating attribute information obtained from the fingerprint image data.

The attribute information obtained from the received image data and the stored attribute information that are compared during an authentication process may include biometric template data corresponding to the received image data and biometric template data corresponding to the stored image data. One well-known type of biometric template data is fingerprint template data, which may indicate types and locations of fingerprint minutia or keypoints. A user authentication process based on attributes of fingerprint image data may involve comparing received and stored fingerprint template data. Such a process may or may not involve directly comparing received and stored fingerprint image data.

Similarly, biometric template data corresponding to sub-epidermal features may include information regarding the attributes of blood vessels, such as information regarding the types and locations of blood vessel features, such as blood vessel size, blood vessel orientation, the locations of blood vessel branch points, etc. Alternatively, or additionally, biometric template data corresponding to sub-epidermal features may include attribute information regarding the types (e.g., the sizes, shapes, orientations, etc.) and locations of features of the dermis, features of the subcutis, lymph vessel features, sweat gland features, hair follicle features, hair papilla features, fat lobule features, muscle tissue and/or bone material.

In some implementations, method 400 may involve controlling the light source system to induce photoacoustic emissions from at least a portion of the target object. In some such examples, method 400 may involve receiving second ultrasonic receiver signals from the ultrasonic receiver system corresponding to ultrasonic waves produced via the photoacoustic emissions. Such methods may involve performing the imaging process and/or the authentication process of block 407 based, at least in part, on the second ultrasonic receiver signals.

According to some implementations, method 400 may involve controlling the light source system to illuminate at least a portion of the target object. Some such implementations may involve receiving optical receiver signals from an optical receiver system corresponding to light reflected from the target object. For example, the control system 110 may receive optical receiver signals from an optical receiver system component of the receiver system 108. According to some such examples, the control system 110 may be configured for performing the imaging process or the authentication process of block 407 based, at least in part, on the optical receiver signals.

Figure 6:
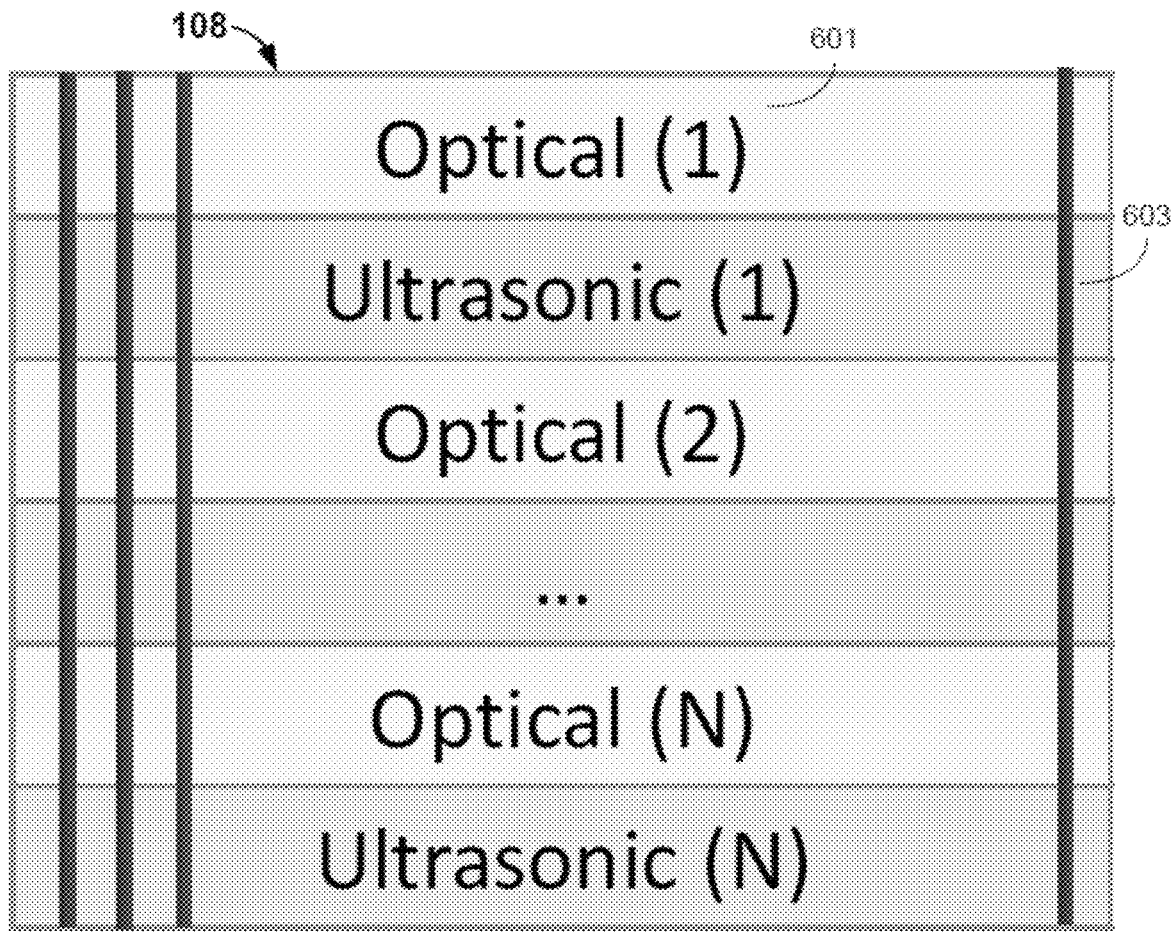
FIG. 6 shows an example of a receiver system 108 that includes optical receiver portions and ultrasonic receiver portions.

FIG. 6 shows an example of a receiver system 108 that includes optical receiver portions and ultrasonic receiver portions. In this example, a single layer of the receiver system 108 includes optical receiver portions 601 and ultrasonic receiver portions 603. As noted above, some films used for screen protection can significantly attenuate ultrasonic signals. Sensor systems that are configured to perform an authentication process and/or an imaging process that is based, at least in part, on optical receiver signals may be able to ameliorate the attenuation of ultrasonic signals caused by screen protection films.

The receiver system 108 that is shown in FIG. 6, or a similar receiver system 108, may be included in implementations of the apparatus 100 that are shown in any one of FIGS. 1-4 and described above. However, the receiver system 108 of FIG. 6 also included in other implementations of the apparatus 100, such as that shown in FIG. 7A and described below.

Returning to FIG. 1, it may be seen that some implementations of the apparatus 100 may include a layer of second metamaterial 114. In some examples, the layer of second metamaterial 114 is configured to convert acoustic waves into light. For example, the layer of second metamaterial 114 may include plasmonic nanorod metamaterials.

In some examples, the control system 110 may be configured to receive optical receiver signals from the optical receiver system and to perform an authentication process and/or an imaging process that is based, at least in part, on the optical receiver signals. At least some of the optical receiver signals may correspond to light emitted by the second metamaterial 114. However, at least some of the optical receiver signals may correspond to light reflected from the target object. According to some examples, the authentication process and/or imaging process also may be based, at least in part, on ultrasonic receiver signals.

According to some examples, the control system 110 may be configured to control the light source system 106 to induce photoacoustic emissions from a target object in contact with, or proximate, the cover layer 102. In some examples, the second metamaterial 114 may convert ultrasonic waves resulting from these photoacoustic emissions into light.

Figure 7A:
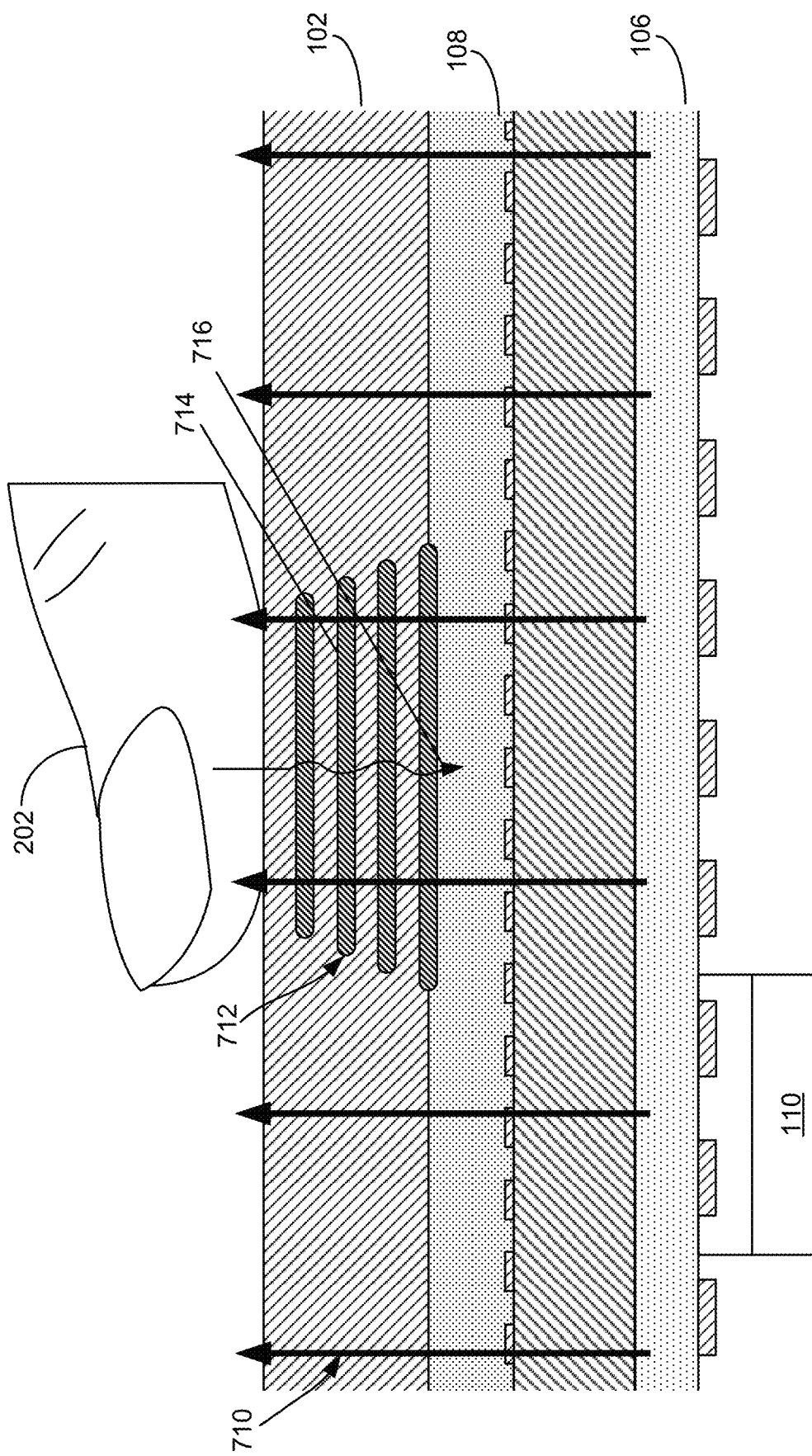
FIG. 7A shows another example of an apparatus configured to perform at least some methods disclosed herein.

FIG. 7A shows another example of an apparatus configured to perform at least some methods disclosed herein. Some implementations of the apparatus 700 may be considered another instance of the apparatus 100 shown in FIG. 1. In this example, the cover layer 102 includes a layer of metamaterial 714. The layer of metamaterial 714 may be considered an instance of the layer of second metamaterial 114 that is shown in FIG. 1. However, some implementations of the apparatus 700 do not include a layer of first metamaterial 104 that includes nanoparticles suitable for ultrasonic insonification.

In this example, the light source system 106 does not require a waveguide. According to some examples, the light source system 106 may include one or more LEDs and/or laser diodes. In some examples, the light source system 106 may be a backlight of a display.

According to some examples, the light source system 106 may be configured to induce photoacoustic emissions from a target object (such as the target object 202) in contact with, or proximate, the cover layer 102. For example, the control system 110 may control the light source system 106 to induce photoacoustic emissions in the target object 202 via the light 710. In some examples, the metamaterial 714 may convert ultrasonic waves 712 resulting from these photoacoustic emissions into light 716, some of which may be detected by an optical receiver of the receiver system 108.

In some examples, the control system 110 may be configured to receive optical receiver signals from the optical receiver system and to perform an authentication process and/or an imaging process that is based, at least in part, on the optical receiver signals. At least some of the optical receiver signals may correspond to light emitted by the second metamaterial 114. However, at least some of the optical receiver signals may correspond to light reflected from the target object.

In some implementations, the receiver system 108 also may include an ultrasonic receiver system. According to some such implementations, the optical receiver system and the ultrasonic receiver system may reside in a single layer of the receiver system 108, e.g., as shown in FIG. 6. In some instances, at least some of the ultrasonic waves 712 resulting from photoacoustic emissions may be received by the ultrasonic receiver system. According to some examples, the authentication process and/or imaging process also may be based, at least in part, on ultrasonic receiver signals received from the ultrasonic receiver system. Some alternative implementations may include an ultrasonic transmitter.

An implementation such as that shown in FIG. 7A and described above has potential advantages. For example, an optical sensor will not generally be adversely affected by the screen protection films that can potentially degrade the performance of an ultrasonic sensor. Optical sensors may, for example, be placed under a millimeter of glass, including curved 2.5D glass, and still accurately detect fingerprints in cases where ultrasonic fingerprint sensors may provide a degraded image quality. Optical sensors may include components such as lenses, enabling a relatively large depth of focus. Accordingly, the additional thickness of a screen protector may be accommodated. Because the speed of light is much greater than the speed of sound, the additional thickness of a screen protector does not impact total time of flight significantly for an optical sensor. By contrast, the additional thickness of a screen protector may cause ultrasonic fingerprint sensors to need recalibration of range gate delay and, in some instances, transmit frequency.

Receiver systems 108 that include both optical receivers and ultrasonic receivers also have advantages. The frame rate and spatial resolution of the optical and ultrasonic receivers may be adjusted. For example, the optical receiver may provide relatively higher spatial resolution at a relatively lower frame rate, whereas the ultrasonic transceiver may provide a relatively lower spatial resolution at a relatively higher frame rate. One receiver may have a lower-power imaging mode and the other may have a higher-power imaging mode that is used only when needed or when advantageous. In some instances, the optical receiver and the ultrasonic transceiver may be separately tuned according to the characteristics of each component.

In some implementations, signals from the optical receiver and signals from the ultrasonic receiver may be combined to form a single image, whereas in other examples signals from the optical receiver and signals from the ultrasonic receiver may be used to form separate images. For example, if both optical receiver signals and ultrasonic receiver signals are used for an imaging process and/or for an authentication process, signal processing may involve cross-correlation of the optical receiver signals and ultrasonic receiver signals. In some instances, image data may be obtained either from optical receiver signals or ultrasonic receiver signals, depending on which is currently providing higher-quality signals. For example, if the image quality of the ultrasonic receiver signals is currently degraded (e.g., due to a dry finger), the optical receiver signals may be used for an imaging process and/or for an authentication process.

Figure 7B:
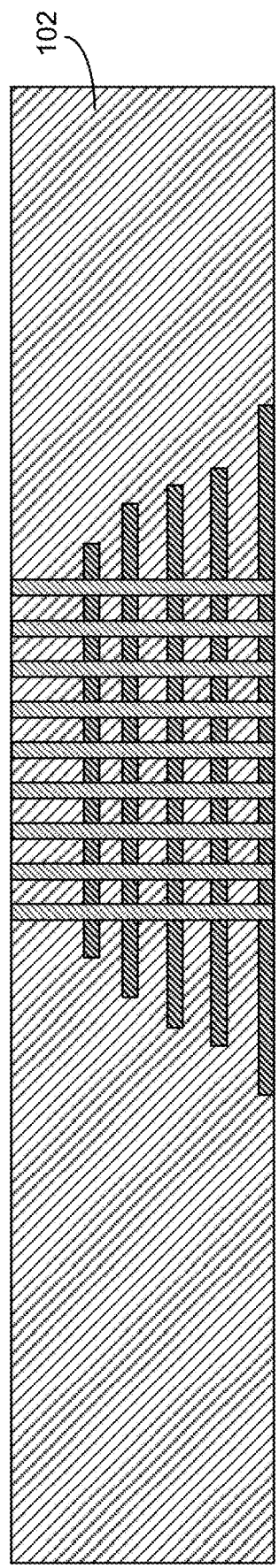
FIG. 7B shows an alternative example of a layer of the apparatus of FIG. 7A.

FIG. 7B shows an alternative example of a layer of the apparatus of FIG. 7A. In this example, the cover layer 102 includes two types of metamaterial. According to this implementation, vertical nano-rods 720 are configured to convert acoustic waves to light waves, whereas horizontal metamaterial layers 725 are configured to convert light waves to acoustic waves. The vertical nano-rods 720 can help to propagate information from a target object above the cover layer 102 to a sensor system below the cover layer 102. In some implementations, the vertical nano-rods 720 and/or the horizontal metamaterial layers 725 may extend through more of the cover layer 102 than indicated in FIG. 7B and may, in some examples, extend throughout the entire cover layer 102.

Figure 8:
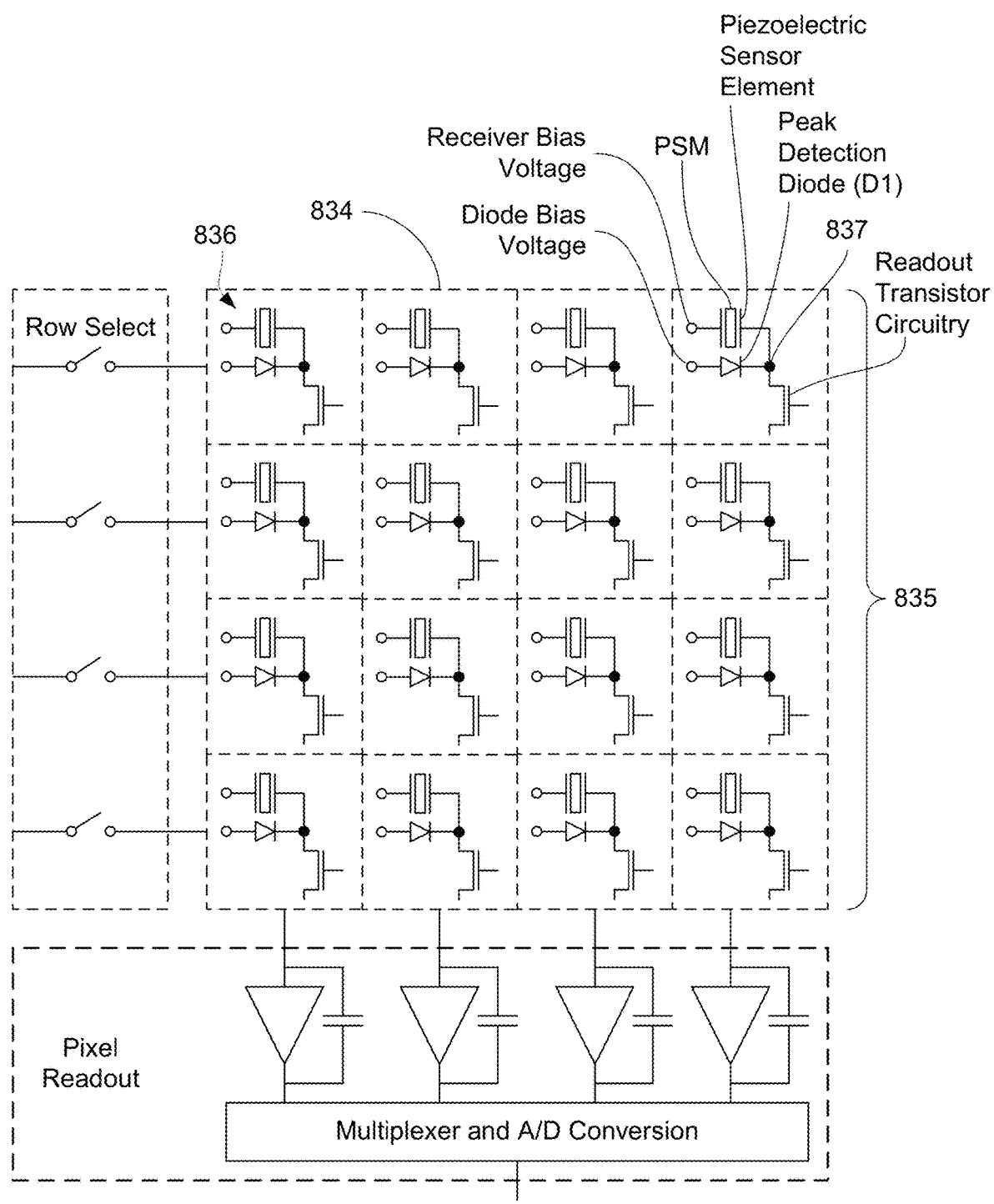
FIG. 8 representationally depicts aspects of a 4×4 pixel array of sensor pixels for an ultrasonic sensor system.

FIG. 8 representationally depicts aspects of a 4×4 pixel array of sensor pixels for an ultrasonic sensor system. Each pixel 834 may be, for example, associated with a local region of piezoelectric sensor material (PSM), a peak detection diode (D1) and a readout transistor (M3); many or all of these elements may be formed on or in a substrate to form the pixel circuit 836. In practice, the local region of piezoelectric sensor material of each pixel 834 may transduce received ultrasonic energy into electrical charges. The peak detection diode D1 may register the maximum amount of charge detected by the local region of piezoelectric sensor material PSM. Each row of the pixel array 835 may then be scanned, e.g., through a row select mechanism, a gate driver, or a shift register, and the readout transistor M3 for each column may be triggered to allow the magnitude of the peak charge for each pixel 834 to be read by additional circuitry, e.g., a multiplexer and an A/D converter. The pixel circuit 836 may include one or more TFTs to allow gating, addressing, and resetting of the pixel 834.

Each pixel circuit 836 may provide information about a small portion of the object detected by the ultrasonic sensor system. While, for convenience of illustration, the example shown in FIG. 8 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object.

Figure 9A:
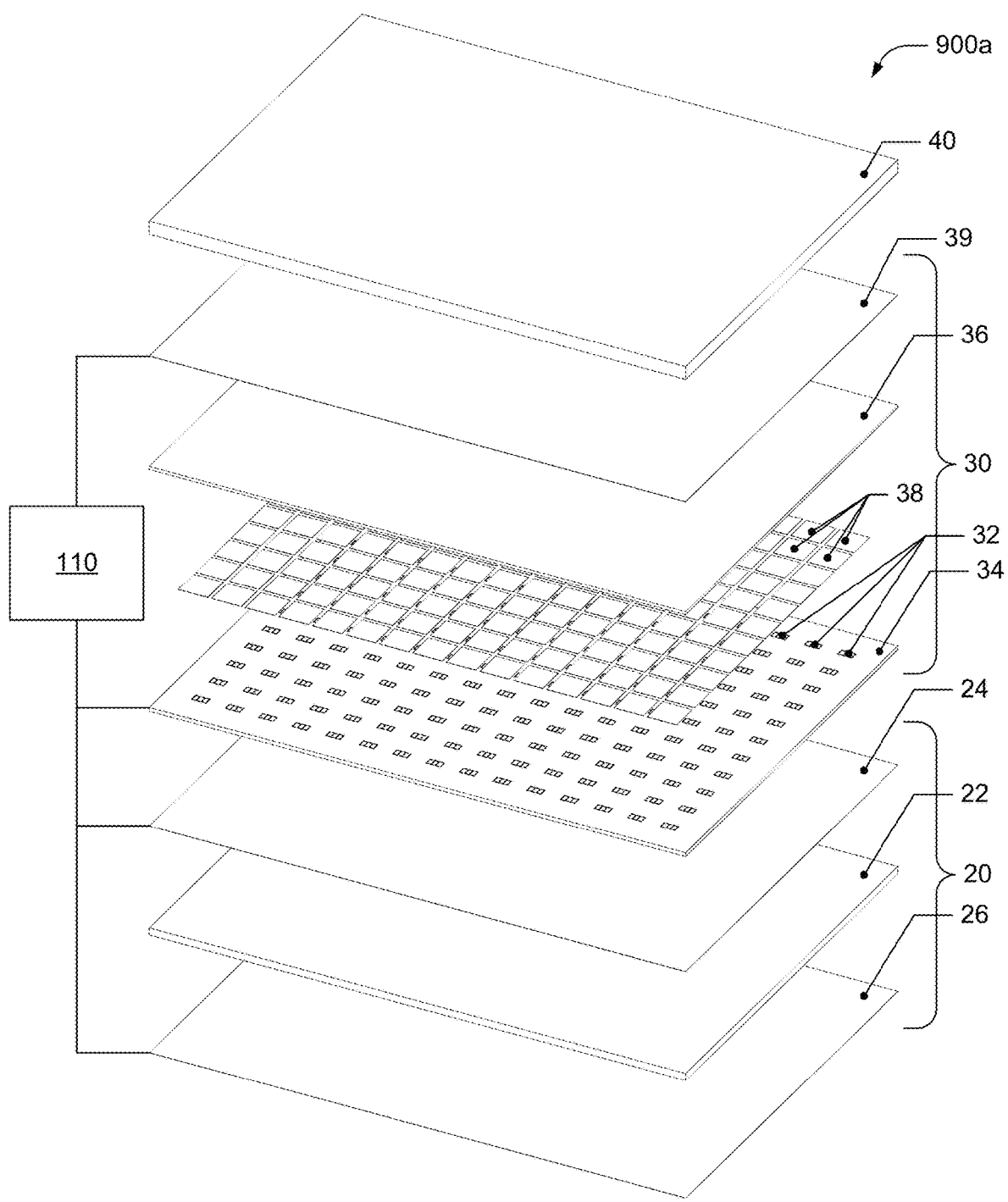
FIGS. 9A and 9B show example arrangements of ultrasonic transmitters and receivers in an ultrasonic sensor system, with other arrangements being possible.

FIG. 9A shows an example of an exploded view of an ultrasonic sensor system. In this example, the ultrasonic sensor system 900a includes an ultrasonic transmitter 20 and an ultrasonic receiver 30 under a platen 40. According to some implementations, the ultrasonic receiver 30 may be an example of the ultrasonic sensor array 102 that is shown in FIG. 1 and described above. In some implementations, the ultrasonic transmitter 20 may be an example of the optional ultrasonic transmitter 108 that is shown in FIG. 1 and described above. The ultrasonic transmitter 20 may include a substantially planar piezoelectric transmitter layer 22 and may be capable of functioning as a plane wave generator. Ultrasonic waves may be generated by applying a voltage to the piezoelectric layer to expand or contract the layer, depending upon the signal applied, thereby generating a plane wave. In this example, the control system 110 may be capable of causing a voltage that may be applied to the planar piezoelectric transmitter layer 22 via a first transmitter electrode 24 and a second transmitter electrode 26. In this fashion, an ultrasonic wave may be made by changing the thickness of the layer via a piezoelectric effect. This ultrasonic wave may travel towards a finger (or other object to be detected), passing through the platen 40. A portion of the wave not absorbed or transmitted by the object to be detected may be reflected so as to pass back through the platen 40 and be received by at least a portion of the ultrasonic receiver 30. The first and second transmitter electrodes 24 and 26 may be metallized electrodes, for example, metal layers that coat opposing sides of the piezoelectric transmitter layer 22.

The ultrasonic receiver 30 may include an array of sensor pixel circuits 32 disposed on a substrate 34, which also may be referred to as a backplane, and a piezoelectric receiver layer 36. In some implementations, each sensor pixel circuit 32 may include one or more TFT elements, electrical interconnect traces and, in some implementations, one or more additional circuit elements such as diodes, capacitors, and the like. Each sensor pixel circuit 32 may be configured to convert an electric charge generated in the piezoelectric receiver layer 36 proximate to the pixel circuit into an electrical signal. Each sensor pixel circuit 32 may include a pixel input electrode 38 that electrically couples the piezoelectric receiver layer 36 to the sensor pixel circuit 32.

In the illustrated implementation, a receiver bias electrode 39 is disposed on a side of the piezoelectric receiver layer 36 proximal to platen 40. The receiver bias electrode 39 may be a metallized electrode and may be grounded or biased to control which signals may be passed to the array of sensor pixel circuits 32. Ultrasonic energy that is reflected from the exposed (top) surface of the platen 40 may be converted into localized electrical charges by the piezoelectric receiver layer 36. These localized charges may be collected by the pixel input electrodes 38 and passed on to the underlying sensor pixel circuits 32. The charges may be amplified or buffered by the sensor pixel circuits 32 and provided to the control system 110.

The control system 110 may be electrically connected (directly or indirectly) with the first transmitter electrode 24 and the second transmitter electrode 26, as well as with the receiver bias electrode 39 and the sensor pixel circuits 32 on the substrate 34. In some implementations, the control system 110 may operate substantially as described above.

For example, the control system 110 may be capable of processing the amplified signals received from the sensor pixel circuits 32.

The control system 110 may be capable of controlling the ultrasonic transmitter 20 and/or the ultrasonic receiver 30 to obtain ultrasonic image data, e.g., by obtaining fingerprint images. Whether or not the ultrasonic sensor system 900a includes an ultrasonic transmitter 20, the control system 110 may be capable of obtaining attribute information from the ultrasonic image data. In some examples, the control system 110 may be capable of controlling access to one or more devices based, at least in part, on the attribute information. The ultrasonic sensor system 900a (or an associated device) may include a memory system that includes one or more memory devices. In some implementations, the control system 110 may include at least a portion of the memory system. The control system 110 may be capable of obtaining attribute information from ultrasonic image data and storing the attribute information in the memory system. In some implementations, the control system 110 may be capable of capturing a fingerprint image, obtaining attribute information from the fingerprint image and storing attribute information obtained from the fingerprint image (which may be referred to herein as fingerprint image information) in the memory system. According to some examples, the control system 110 may be capable of capturing a fingerprint image, obtaining attribute information from the fingerprint image and storing attribute information obtained from the fingerprint image even while maintaining the ultrasonic transmitter 20 in an "off" state.

In some implementations, the control system 110 may be capable of operating the ultrasonic sensor system 900a in an ultrasonic imaging mode or a force-sensing mode. In some implementations, the control system may be capable of maintaining the ultrasonic transmitter 20 in an "off" state when operating the ultrasonic sensor system in a force-sensing mode. The ultrasonic receiver 30 may be capable of functioning as a force sensor when the ultrasonic sensor system 900a is operating in the force-sensing mode. In some implementations, the control system 110 may be capable of controlling other devices, such as a display system, a communication system, etc. In some implementations, the control system 110 may be capable of operating the ultrasonic sensor system 900a in a capacitive imaging mode.

The platen 40 may be any appropriate material that can be acoustically coupled to the receiver, with examples including plastic, ceramic, sapphire, metal and glass. In some implementations, the platen 40 may be a cover plate, e.g., a cover glass or a lens glass for a display. Particularly when the ultrasonic transmitter 20 is in use, fingerprint detection and imaging can be performed through relatively thick platens if desired, e.g., 3 mm and above. However, for implementations in which the ultrasonic receiver 30 is capable of imaging fingerprints in a force detection mode or a capacitance detection mode, a thinner and relatively more compliant platen 40 may be desirable. According to some such implementations, the platen 40 may include one or more polymers, such as one or more types of parylene, and may be substantially thinner. In some such implementations, the platen 40 may be tens of microns thick or even less than 10 microns thick.

Examples of piezoelectric materials that may be used to form the piezoelectric receiver layer 36 include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 22 and the piezoelectric receiver layer 36 may be selected so as to be suitable for generating and receiving ultrasonic waves. In one example, a PVDF planar piezoelectric transmitter layer 22 is approximately 28 µm thick and a PVDF-TrFE receiver layer 36 is approximately 12 µm thick. Example frequencies of the ultrasonic waves may be in the range of 1 MHz to 30 MHz, with wavelengths on the order of a millimeter or less.

Figure 9B:
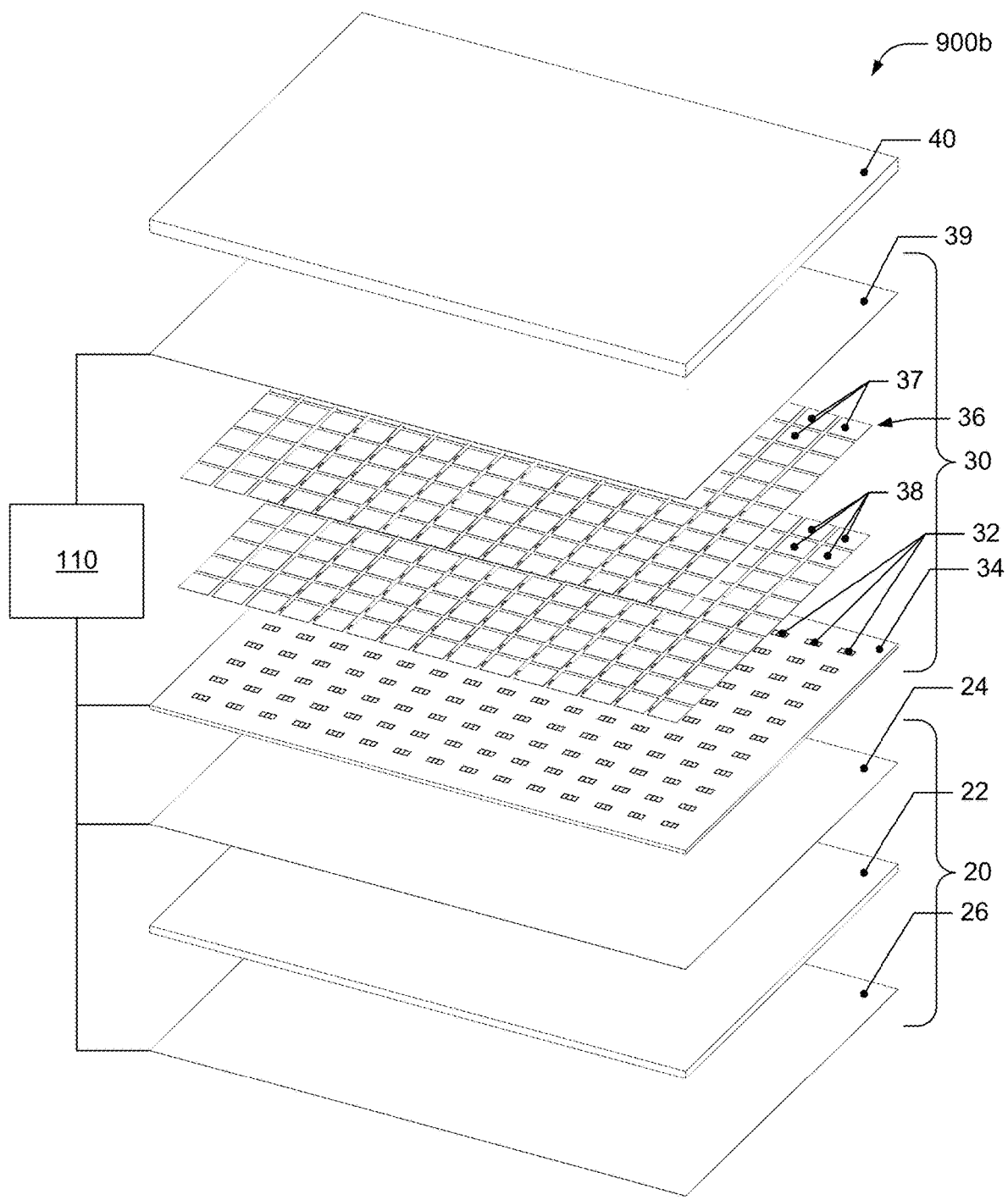

FIG. 9B shows an exploded view of an alternative example of an ultrasonic sensor system. In this example, the piezoelectric receiver layer 36 has been formed into discrete elements 37. In the implementation shown in FIG. 9B, each of the discrete elements 37 corresponds with a single pixel input electrode 38 and a single sensor pixel circuit 32. However, in alternative implementations of the ultrasonic sensor system 900b, there is not necessarily a one-to-one correspondence between each of the discrete elements 37, a single pixel input electrode 38 and a single sensor pixel circuit 32. For example, in some implementations there may be multiple pixel input electrodes 38 and sensor pixel circuits 32 for a single discrete element 37.

FIGS. 9A and 9B show example arrangements of ultrasonic transmitters and receivers in an ultrasonic sensor system, with other arrangements being possible. For example, in some implementations, the ultrasonic transmitter 20 may be above the ultrasonic receiver 30 and therefore closer to the object(s) to be detected. In some implementations, the ultrasonic transmitter may be included with the ultrasonic sensor array (e.g., a single-layer transmitter and receiver). In some implementations, the ultrasonic sensor system may include an acoustic delay layer. For example, an acoustic delay layer may be incorporated into the ultrasonic sensor system between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The acoustic delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the object by virtue of having been reflected by the object may be made to arrive at the ultrasonic receiver 30 during a time range when it is unlikely that energy reflected from other parts of the ultrasonic sensor system is arriving at the ultrasonic receiver 30. In some implementations, the substrate 34 and/or the platen 40 may serve as an acoustic delay layer.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus, comprising:
a cover layer;
a layer of first metamaterial within or proximate the cover layer, the first metamaterial comprising nanoparticles configured to resonate and create an ultrasonic wave when illuminated by light;
a light source system configured for providing the light to the layer of first metamaterial; and
a receiver system comprising an ultrasonic receiver system configured to receive ultrasonic waves reflected from a target object in contact with, or proximate, a surface of the cover layer.

2. The apparatus of claim 1, wherein the light source system comprises a waveguide proximate the layer of first metamaterial, the waveguide configured for receiving the light from the light source and providing the light to the layer of first metamaterial.

3. The apparatus of claim 1, wherein the light source system comprises a light source configured to emit the light and wherein the light includes a resonant frequency of at least some of the nanoparticles.

4. The apparatus of claim 1, further comprising a control system configured to control the light source system to cause the nanoparticles to emit the ultrasonic waves in a range of 1 MHz to 30 MHz.

5. The apparatus of claim 4, wherein the control system is configured to:
receive ultrasonic receiver signals from the ultrasonic receiver system corresponding to the ultrasonic waves reflected from the target object; and
perform at least one of an authentication process or an imaging process that is based, at least in part, on the ultrasonic receiver signals.

6. The apparatus of claim 1, wherein the cover layer comprises an optically opaque or optically translucent platen.

7. The apparatus of claim 1, wherein the cover layer is optically transparent.

8. The apparatus of claim 7, wherein the receiver system comprises an optical receiver system.

9. The apparatus of claim 8, wherein a single layer of the receiver system includes portions of the optical receiver system and portions of the ultrasonic receiver system.

10. The apparatus of claim 8, further comprising a layer of second metamaterial configured to convert acoustic waves into light.

11. The apparatus of claim 10, further comprising a control system configured to control the light source system, wherein the control system is further configured to:
receive optical receiver signals from the optical receiver system; and
perform at least one of an authentication process or an imaging process that is based, at least in part, on the optical receiver signals.

12. The apparatus of claim 11, wherein at least some of the optical receiver signals correspond to the light emitted by the second metamaterial.

13. The apparatus of claim 11, wherein the control system is configured to control the light source system to induce photoacoustic emissions from the target object.

14. The apparatus of claim 11, wherein at least some of the optical receiver signals correspond to reflected light reflected from the target object.

15. The apparatus of claim 11, wherein the control system is further configured to:
receive ultrasonic receiver signals from the ultrasonic receiver system corresponding to the ultrasonic waves reflected from the target object; and
perform the authentication process or the imaging process based, at least in part, on the ultrasonic receiver signals.

16. The apparatus of claim 10, wherein the cover layer comprises the layer of second metamaterial.

17. The apparatus of claim 1, wherein the ultrasonic receiver system comprises a piezoelectric layer that includes at least one of micro- or nano-particles in a piezoelectric polymer matrix.

18. The apparatus of claim 17, wherein the at least one of micro- or nano-particles comprise ferroelectric material.

19. A mobile device that comprises the apparatus of claim 1.

20. The apparatus of claim 19, wherein the mobile device comprises a cellular telephone.

21. A method, comprising:
controlling a light source system to emit light that causes at least some nanoparticles of a layer of first metamaterial to emit ultrasonic waves;
receiving first ultrasonic receiver signals from an ultrasonic receiver system corresponding to the ultrasonic waves generated by the nanoparticles and reflected from a target object; and
performing at least one of an imaging process or an authentication process based, at least in part, on the first ultrasonic receiver signals.

22. The method of claim 21, further comprising:
controlling the light source system to illuminate at least a portion of the target object;
receiving optical receiver signals from an optical receiver system corresponding to reflected light reflected from the target object; and
performing the imaging process or the authentication process based, at least in part, on the optical receiver signals.

23. The method of claim 21, further comprising:
controlling the light source system to induce photoacoustic emissions from at least a portion of the target object;
receiving second ultrasonic receiver signals from the ultrasonic receiver system corresponding to ultrasonic waves produced via the photoacoustic emissions; and
performing at least one of the imaging process or the authentication process based, at least in part, on the second ultrasonic receiver signals.

24. One or more non-transitory storage media having instructions for controlling one or more devices to perform a method stored thereon, the method comprising:
controlling a light source system to emit light that causes at least some nanoparticles of a layer of first metamaterial to emit ultrasonic waves;
receiving first ultrasonic receiver signals from an ultrasonic receiver system corresponding to the ultrasonic waves generated by the nanoparticles and reflected from a target object; and
performing at least one of an imaging process or an authentication process based, at least in part, on the first ultrasonic receiver signals.

25. The one or more non-transitory storage media of claim 24, wherein the method further comprises:
controlling the light source system to illuminate at least a portion of the target object;
receiving optical receiver signals from an optical receiver system corresponding to reflected light reflected from the target object; and
performing the imaging process or the authentication process based, at least in part, on the optical receiver signals.

26. The one or more non-transitory storage media of claim 24, wherein the method further comprises:
controlling the light source system to induce photoacoustic emissions from at least a portion of the target object;
receiving second ultrasonic receiver signals from an ultrasonic receiver system corresponding to ultrasonic waves corresponding to the photoacoustic emissions; and
performing at least one of the imaging process or the authentication process based, at least in part, on the second ultrasonic receiver signals.

27. An apparatus, comprising:
a cover layer;
a layer of first metamaterial within or proximate the cover layer, the first metamaterial comprising nanoparticles configured to resonate and create an ultrasonic wave when illuminated by light;
light source means for providing the light to the layer of first metamaterial; and
a receiver system comprising an ultrasonic receiver system configured to receive ultrasonic waves reflected from a target object in contact with a surface of the cover layer.

28. The apparatus of claim 27, wherein the light source means comprises a waveguide proximate the layer of first metamaterial, the waveguide configured for receiving the light from the light source and providing the light to the layer of first metamaterial.

29. The apparatus of claim 27, wherein the light source means comprises a light source configured to emit light that includes a resonant frequency of at least some of the nanoparticles.

30. The apparatus of claim 27, further comprising control means for controlling the light source system to emit pulses of light at a time interval in a range of 1 MHz to 30 MHz.

* * * * *